United States Patent [19]
Taylor

[11] Patent Number: 5,024,809
[45] Date of Patent: Jun. 18, 1991

[54] CORROSION RESISTANT COMPOSITE CLADDINGS FOR NUCLEAR FUEL RODS

[75] Inventor: Dale F. Taylor, Schenectady, N.Y.

[73] Assignee: General Electric Company, Schenectady, N.Y.

[21] Appl. No.: 561,135

[22] Filed: Aug. 1, 1990

Related U.S. Application Data

[63] Continuation of Ser. No. 356,482, May 25, 1989.

[51] Int. Cl.$^5$ .............................................. G21C 3/00
[52] U.S. Cl. ................................. 376/417; 376/362; 376/434; 376/457; 420/422
[58] Field of Search ............... 376/417, 362, 434, 457; 420/422

[56] References Cited

U.S. PATENT DOCUMENTS

| | | | |
|---|---|---|---|
| 2,772,964 | 12/1956 | Thomas et al. | 75/177 |
| 3,148,055 | 9/1964 | Kass et al. | 75/177 |
| 4,200,492 | 4/1980 | Amijo et al. | 176/82 |
| 4,735,768 | 4/1988 | Stehle et al. | 376/416 |
| 4,775,508 | 10/1988 | Sabol et al. | 376/416 |
| 4,863,685 | 9/1989 | Taylor | 420/422 |
| 4,876,064 | 10/1989 | Taylor | 420/422 |
| 4,894,203 | 1/1990 | Adamson | 376/416 |

FOREIGN PATENT DOCUMENTS

| | | |
|---|---|---|
| 227989 | 2/1986 | European Pat. Off. |
| 61-26738 | 2/1986 | Japan |

OTHER PUBLICATIONS

Nuclear Fuel Element, Abstract Japanese Patent 63-138295, Oarai.
Nuclear Fuel Sheath, Abstract Japanese Patent Publication Sho 63-7352.
Fuel Rod of a Nuclear Reactor, Abstract Swedish Patent 441,714.

*Primary Examiner*—Stephen J. Lechert, Jr.
*Assistant Examiner*—Nina Bhat
*Attorney, Agent, or Firm*—James E. McGinness; James C. Davis, Jr.; James Magee, Jr.

[57] ABSTRACT

A nuclear fuel element for use in the core of a nuclear reactor is disclosed having an improved corrosion resistant cladding. The cladding is comprised of zirconium alloys containing in weight percent 0.5 to 2.0 percent tin, or 0.5 to 2.5 percent bismuth, or 0.5 to 2.5 percent bismuth and tin, and about 0.5 to 1.0 percent of a solute composed of a member selected from the group consisting of molybdenum, niobium, tellurium and mixtures thereof, and the balance zirconium. Composite claddings are disclosed having a surface layer of one of the corrosion resistant zirconium alloys metallurgically bonded to a Zircaloy alloy tube. Claddings may contain an inner barrier layer of a moderate purity zirconium metallurgically bonded on the inside surface of the cladding to provide protection from fission products and gaseous impurities generated by the enclosed nuclear fuel.

72 Claims, 3 Drawing Sheets

CORROSION RESISTANT COMPOSITE CLADDINGS FOR NUCLEAR FUEL RODS

This application is a continuation of application Ser. No. 07/356,482 filed May 25, 1989.

BACKGROUND OF THE INVENTION

1. Field of the Invention

The present invention relates to nuclear fuel elements suitable for use in nuclear reactor service, and in particular to uniform and nodular corrosion resistant elements and composite claddings for the elements.

2. Description of Related Art

Nuclear fuel element cladding serves several purposes and two primary purposes are: first, to prevent contact and chemical reactions between the nuclear fuel and the coolant or the moderator if a moderator is present, or both if both coolant and moderator are present; and second, to prevent the radioactive fission products, some of which are gases, from being released from the fuel into the coolant or the moderator or both if both coolant and moderator are present. The failure of the cladding, i.e., a loss of the leak-proof seal, can contaminate the coolant or moderator and the associated systems with radioactive long-lived products to a degree which interferes with plant operation.

Zirconium-based alloys have long been used in the cladding of fuel elements in nuclear reactors. A desirable combination is found in zirconium by virtue of its low thermal neutron cross-section and its generally acceptable level of resistance to corrosion in a boiling water reactor environment. Zircaloy 2, a zirconium alloy containing tin, nickel, iron and chromium, has enjoyed widespread use and continues to be used at present in nuclear reactor applications. This alloy has provided adequate performance in reactor service, but also possesses some deficiencies that have prompted further research to find materials providing improved performance. For example, Zircaloy 2 cladding on fuel elements in nuclear reactors absorbs hydrogen while the reactor is operating. When the reactor is shut down and the cladding cools the Zircaloy 2 is embrittled by the absorbed hydrogen. Zircaloy 4 was one alloy developed as a result of further research to improve Zircaloy 2. Zircaloy 4 essentially eliminates the Ni (0.007% max. wt. percent) from a Zircaloy 2-type alloy. Zircaloy 4 was developed as an improvement over Zircaloy 2 to reduce absorption of hydrogen in Zircaloy 2. Zircaloy 2 consists of about 1.2 to 1.7 percent tin, 0.07 to 0.2 percent iron, 0.05 to 0.15 percent chromium, 0.03 to 0.08 percent nickel, up to 0.15 percent oxygen, and the balance zirconium. Zircaloy 4 is similar to Zircaloy 2 but contains less nickel and slightly more iron. Zircaloy 2 and Zircaloy 4 are herein referred to as the Zircaloy alloys or Zircaloy.

The Zircaloy alloys are among the best corrosion resistant materials when tested in water at reactor operating temperatures, typically about 290° C., but in the absence of radiation from the nuclear fission reaction. The corrosion rate in water at 290° C. is very low and the corrosion product is a uniform, tightly adherent, black $ZrO_2$ film. In actual service, however, the Zircaloy is irradiated and is also exposed to radiolysis products present in reactor water. The corrosion resistance properties of Zircaloy deteriorate under these conditions and the corrosion rate thereof is accelerated.

Research efforts directed at improving the corrosion properties of the zirconium-based alloys have yielded some advances. Corrosion resistance has been enhanced in some instances through carefully controlled heat treatments of the alloys either prior to or subsequent to material fabrication. Added heat treatment cycles, however, generally increase the expense of making finished products, and in those instances where an installation requires welding to be performed, the area affected by the heat of the welding operation may not possess the same corrosion resistance characteristics as the remainder of the article. Variations in the alloying elements employed and the percentages of the alloying elements have also been propounded in an effort to address the deterioration in the corrosion-resistance of these alloys when they are irradiated.

The deterioration under actual reactor conditions of the corrosion resistance properties of Zircaloy is not manifested in merely an increased uniform rate of corrosion. Rather, in addition to the black $ZrO_2$ layer formed, a localized, or nodular corrosion phenomenon has been observed in some instances on Zircaloy tubing in boiling water reactors. In addition to producing an accelerated rate of corrosion, the corrosion product of the nodular corrosion reaction is a highly undesirable white $ZrO_2$ bloom which is less adherent and lower in density than the black $ZrO_2$ layer.

The increased rate of corrosion caused by the nodular corrosion reaction will be likely to shorten the service life of the tube cladding, and also this nodular corrosion will have a detrimental effect on the efficient operation of the reactor. The white $ZrO_2$, being less adherent, may be prone to spalling or flaking away from the tube into the reactor water. On the other hand, if the nodular corrosion product does not spall away, a decrease in heat transfer efficiency through the tube into the water is created when the nodular corrosion proliferates and the less dense white $ZrO_2$ covers all or a large portion of a tube.

Actual reactor conditions cannot be readily duplicated for normal laboratory research due to the impracticality of employing a radiation source to simulate the irradiation experienced in a reactor. Additionally, gaining data from actual use in reactor service is an extremely time consuming process. For this reason, there is no conclusory evidence in the prior art which explains the exact corrosion mechanism which produces the nodular corrosion. This limits, to some degree, the capability to ascertain whether other alloys will be susceptible to nodular corrosion before actually placing samples made from these alloys into reactors.

Laboratory tests conducted under the conditions normally experienced in a reactor at approximately 300° C. and 1000 psig in water, but absent radiation, will not produce a nodular corrosion product on Zircaloy alloys like that found in some instances on Zircaloy alloys which have been used in reactor service. However, if steam is used, with the temperature increased to over 500° C. and the pressure raised to 1500 psig, a nodular corrosion product like that occasionally found on Zircaloy in reactor service can be produced on Zircaloy alloys in laboratory tests. Specimens of Zircaloy alloys which are annealed at 750° C. for 48 hours are particularly susceptible to nodular corrosion under these test conditions. These annealed Zircaloy specimens will produce, in tests run for relatively short times, i.e. 24 hours, a degree of nodular corrosion comparable to that of Zircaloy tube cladding in actual reactor service that has been found to have nodular corrosion. At this higher temperature and pressure, a simulated nuclear reactor environment is provided which will allow researchers to determine the susceptibility of new alloys to nodular corrosion. With this test, a comparison between samples from new alloys and Zircaloy specimens tested under the same conditions can be made.

To be considered as a suitable alternate or replacement for the Zircaloy alloys, any new alloy must not only be less susceptible than the Zircaloy alloys to nodular corrosion, but must maintain acceptable uniform corrosion rates, comparable to those of the Zircaloy alloys, to ensure sufficient service life. Zircaloy alloys have been used extensively as fuel rod cladding and are known to contain many desirable properties that alternate or replacement alloys must also contain. Zircaloy alloys have the desirable properties of a low neutron absorption cross section and at temperatures below 750° F. are strong, ductile, extremely stable and as mentioned previously have excellent uniform corrosion resistance in water at reactor operating temperatures.

Fuel element performance has revealed another problem with brittle splitting of nuclear fuel element cladding due to the combined interactions between the nuclear fuel, the cladding and the fission products produced during nuclear fission reactions. It has been discovered that this undesirable performance is due to localized mechanical stresses on the fuel cladding resulting from differential expansion and friction between the fuel and the cladding. Fission products are created in the nuclear fuel by the fission chain reaction during operation of a nuclear reactor, and these fission products are released from the nuclear fuel and are present at the cladding surface. These localized stresses and strains in the presence of specific fission products, such as iodine and cadmium, are capable of producing cladding failures by phenomena known as stress corrosion cracking or liquid metal embrittlement.

It is therefore an object of this invention to provide nuclear fuel elements having improved corrosion resistance in a nuclear reactor environment.

It is another object of the present invention to provide corrosion resistant nuclear fuel elements made with composite fuel rod cladding having an improved corrosion resistant surface layer on a Zircaloy cladding.

It is another object of this invention to provide corrosion resistant fuel elements made with composite cladding containers that are resistant to nodular corrosion and to corrosion from interactions between the nuclear fuel and the cladding.

BRIEF DESCRIPTION OF THE INVENTION

The corrosion resistant nuclear fuel elements of this invention are encased with cladding container tubing made from nodular corrosion resistant zirconium alloys. Resistance to nodular corrosion is improved in the claddings of this invention by use of certain improved zirconium alloys. Zirconium is stable in the alpha phase at temperatures below about 863° C. and in zirconium alloys this alpha-phase transformation temperature will increase or decrease by about 150° C. Nuclear reactor operating temperatures are well below 860° C. and the zirconium alloy tubing therefore remains in the alpha-phase.

The improved zirconium alloys used in the claddings of this invention and other known zirconium alloys have additives that are soluble in the alpha phase of zirconium, as well as solute elements that are not soluble in the alpha phase. Certain solute elements present in these zirconium alloys provide an increased resistance to nodular corrosion in zirconium alloys. Solute elements are sometimes herein referred to as solutes.

We have found that some soluble additives used with certain other solutes or groups of solutes provide protection from uniform corrosion that is comparable to Zircaloy alloys but the solutes and groups of solutes we have found, also provide increased resistance to nodular corrosion over Zircaloy alloys.

Therefore, in accordance with this invention, a corrosion-resistant nuclear fuel element is provided by making an elongated cladding container from a first zirconium alloy consisting essentially of by weight percent 0.5 to 2.0 percent tin, 0.5 to 1.0 percent of a solute composed of molybdenum, tellurium, and the balance zirconium.

Another corrosion-resistant fuel element is provided by making an elongated cladding container from a second zirconium alloy consisting essentially of by weight percent 0.5 to 2.0 percent tin, 0.5 to 1.0 percent of a solute, the solute consisting of niobium, the amount of niobium being less than 0.5 percent of the alloy, and a member selected from the group consisting of molybdenum, tellurium, and mixtures thereof, and the balance zirconium.

Another corrosion-resistant fuel element is provided by making an elongated cladding container from a third zirconium alloy, consisting essentially of by weight percent 0.5 to 2.0 percent tin, 0.5 to 1.0 percent of a solute composed of niobium and tellurium, and the balance zirconium.

Another corrosion-resistant fuel element is provided by making an elongated cladding container from a fourth zirconium alloy consisting essentially of by weight percent 0.5 to 2.0 percent tin, 0.6 to 1.0 percent of a solute, the solute being composed of niobium, molybdenum, and tellurium, the amount of niobium being at least 0.5 percent, and the balance zirconium.

Another corrosion-resistant fuel element is provided by making an elongated cladding container from a fifth zirconium alloy consisting essentially of by weight percent 0.5 to 2.0 percent tin, 0.3 to 1.4 percent of a solute composed of tellurium, and the balance zirconium.

Another corrosion-resistant fuel element is provided by making an elongated cladding container from a sixth zirconium alloy consisting essentially of by weight percent about 0.5 to 2.5 weight percent bismuth, approximately 0.5 to 1.0 percent of a solute composed of a member selected from the group consisting of molybdenum, niobium, tellurium and mixtures thereof, and the balance zirconium.

Another corrosion-resistant fuel element is provided by making an elongated cladding container from a seventh zirconium alloy consisting essentially of by weight percent about 0.5 to 2.5 percent of a mixture of tin and bismuth, approximately 0.5 to 1.0 percent of a solute composed of a member selected from the group consisting of molybdenum, niobium, tellurium and mixtures thereof, and the balance zirconium.

Another corrosion-resistant fuel element is provided by making an elongated cladding container from an eighth zirconium alloy consisting essentially of by weight percent about 0.5 to 2.5 percent bismuth, 0.3 to 1.0 percent of a solute composed of tellurium and the balance zirconium.

Another corrosion-resistant fuel element is provided by making an elongated cladding container from a ninth zirconium alloy consisting essentially of by weight percent about 0.5 to 2.5 percent bismuth and tin, about 0.3 to 1.0 percent of a solute composed of tellurium, and the balance zirconium.

Improved corrosion resistant nuclear fuel elements are also made from composite cladding container tubing having a Zircaloy alloy tube with a surface layer metallurgically bonded on the outside of the Zircaloy tube. The surface layer being about 5 to 20 percent of the thickness of the Zircaloy tube and consisting essentially of one of the first through the ninth zirconium alloys described above. The surface layer is an alloy resistant to nodular corrosion and is thick enough to prevent nodular corrosive attack on the Zircaloy tube.

Another nuclear fuel element is made from a composite cladding container that is resistant to nodular corrosion, stress corrosion cracking and liquid metal embrittlement. An elongated composite cladding container is made from a Zircaloy alloy tube having a corrosion resistant surface layer metallurgically bonded to the outside surface and an inner barrier layer of zirconium metallurgically bonded on the inside of the alloy tube. The inner barrier being about 1 to 30 percent of the thickness of the Zircaloy tube and comprised of moderate purity zirconium such as sponge zirconium. The outer surface layer being about 5 to 20 percent of the thickness of the Zircaloy tube, and consisting essentially of one of the first through the ninth zirconium alloys described above. The surface layer is an alloy resistant to nodular corrosion and is thick enough to prevent nodular corrosive attack on the Zircaloy tube.

Cladding container tubing is manufactured by heating an extrusion billet of one of the first through the ninth zirconium alloys described above to about 590° to 650° C., extruding the billet into tube shell followed by tube reduction and subsequent heat treatments at about 570° to 590° C. to achieve desired tube dimensions and mechanical properties.

Composite cladding containers are manufactured by starting with a tube blank made from a Zircaloy alloy, and an outer tube placed on this tube blank. The outer tube is composed of one of the first through the ninth zirconium alloys described above. This composite tube is then heated to a temperature in the range of 590° to 650° C. and is extruded. In the process, a metallurgical bond between the two zirconium alloys results. Subsequent tube reduction and heat treatments between 570° to 590° C. are performed to achieve the desired tube dimensions and mechanical properties. The outer tube is of at least a thickness so that after tube reduction it is about 5 to 20 percent of the thickness of the Zircaloy tube.

Another composite cladding container is manufactured by starting with a tube blank of a Zircaloy alloy and an outer tube is placed on the tube blank. The outer tube is made from one of the first through the ninth zirconium alloys described above. A hollow collar of a metal barrier is placed inside the tube blank. The metal barrier is comprised of moderate purity zirconium such as sponge zirconium. The composite tubing is heated to 590° to 650° C. and extruded to form a metallurgical bond between the outside surface layer and the tube blank, and between the inner metal barrier and the tube blank. This is followed by tube reduction and subsequent heat treatments between 570° C. and 590° C. to develop the desired tube dimensions and mechanical properties.

The cladding containers and the composite cladding containers enclose a nuclear fuel material, leaving a gap between the fuel and the cladding. In the composite cladding containers having a barrier layer, the barrier layer shields the alloy tube from the nuclear fuel material held in the cladding as well as shielding the alloy tube from fission products and gases. Because of its purity the liner remains soft during irradiation and minimizes localized strain inside the nuclear fuel element, thus serving to protect the alloy tube from stress corrosion cracking or liquid metal embrittlement.

The first through the ninth zirconium alloys described above and the barrier layer do not introduce any significant neutron capture penalties, heat transfer penalties, or material incompatibility problems for the nuclear fuel elements of this invention.

DETAILED DESCRIPTION OF THE INVENTION

Figure 1:
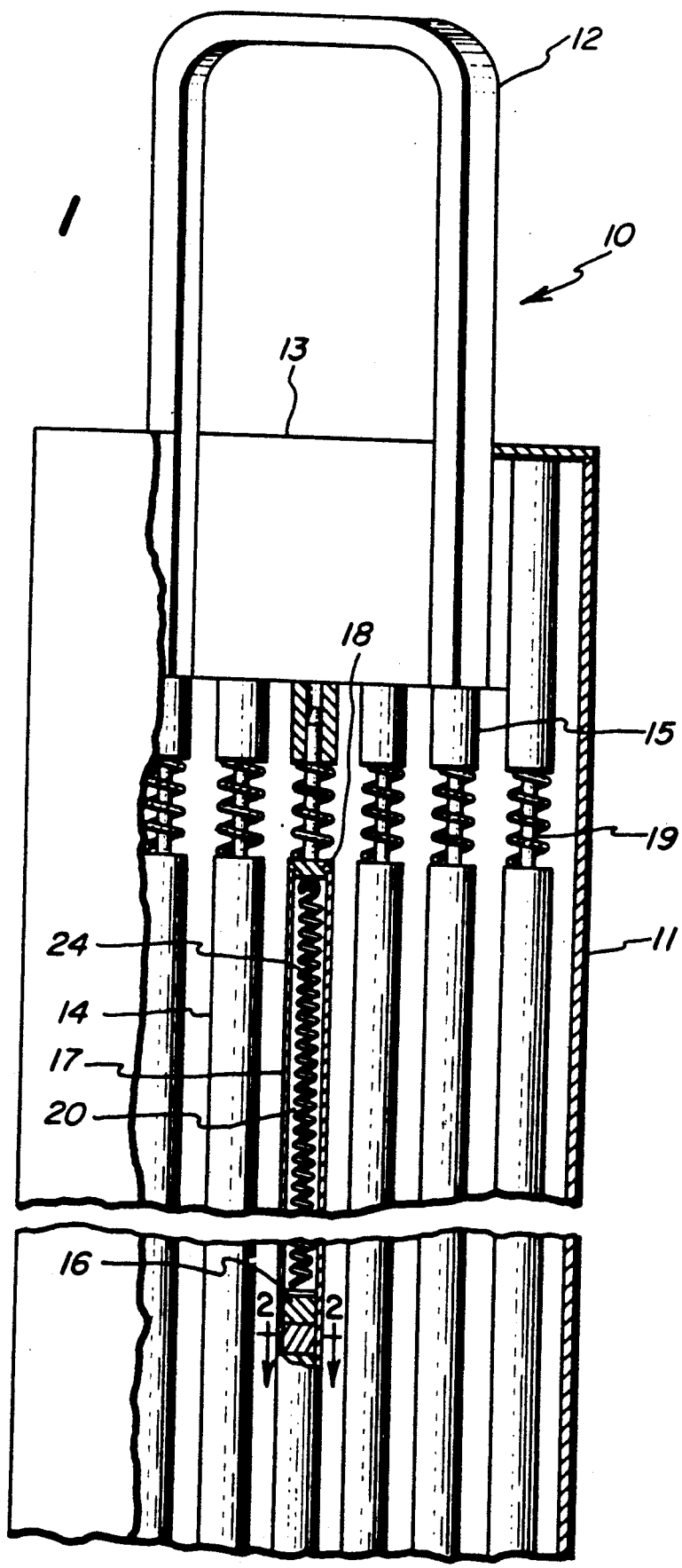
FIG. 1 is a side view of a partial cross section of a nuclear fuel rod assembly.

Referring now more particularly to FIG. 1, there is shown a partially cutaway sectional view of a nuclear fuel assembly 10. This fuel assembly consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in a channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorption, and resistance to bowing and vibration which is occasionally caused by flow of the coolant at high velocity.

A nuclear fuel element or rod 14 is shown in a partial section in FIG. 1 constructed according to the teachings of this invention. The fuel element includes a core or central cylindrical portion of nuclear fuel material 16, here shown as a plurality of fuel pellets of fissionable or fertile material positioned within a structural cladding or container 17. In some cases, the fuel pellets may be of various shapes, such as cylindrical pellets or spheres, and in other cases, different fuel forms such as particulate fuel may be used. The physical form of the fuel is immaterial to this invention. Various nuclear fuel materials may be used, including uranium compounds, plutonium compounds, thorium compounds and mixtures thereof. A preferred fuel is uranium dioxide or a mixture comprising uranium dioxide and plutonium dioxide.

Figure 2:
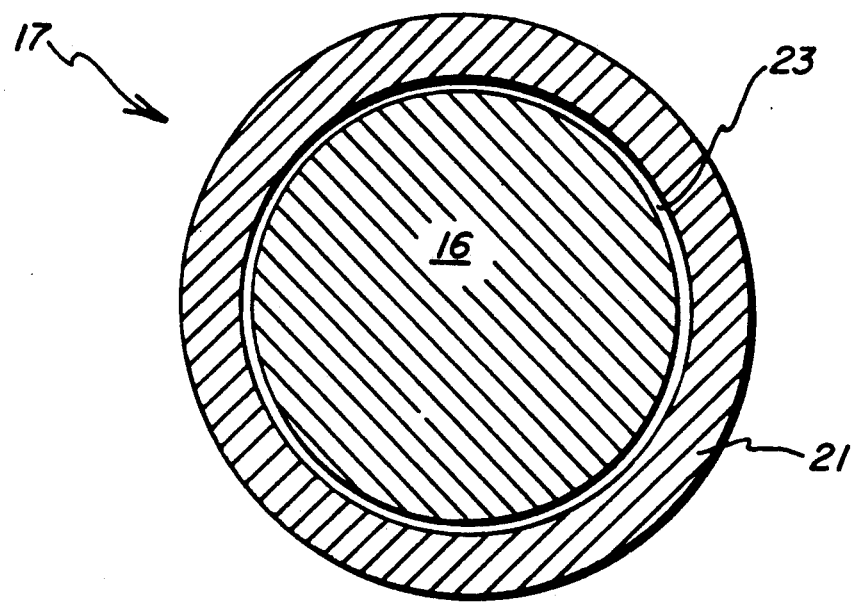
FIG. 2 is a cross-section of a nuclear fuel rod cladding containing nuclear fuel.

Referring now to FIG. 2, the nuclear fuel material 6 forming the central core of the fuel element 14 is surrounded by a cladding 17. The cladding container encloses the core so as to leave a gap between the core and the cladding container during use in a nuclear reactor. The cladding is comprised of a corrosion-resistant zirconium alloy tube 21. In one embodiment of this invention the alloy tube 21 is made from a first zirconium alloy, consisting essentially of by weight percent 0.5 to 2.0 percent tin, 0.5 to 1.0 percent of a solute composed of molybdenum, tellurium, and the balance zirconium.

In a second embodiment of this invention the alloy tube 21 is made from a second zirconium alloy, consisting essentially of by weight percent 0.5 to 2.0 percent tin, 0.5 to 1.0 percent of a solute, the solute consisting of niobium, the amount of niobium being less than 0.5 percent of the alloy, and a member selected from the group consisting of molybdenum, tellurium and mixtures thereof, and the balance zirconium.

In a third embodiment of this invention, the alloy tube 21 is made from a third zirconium alloy, consisting essentially of by weight percent 0.5 to 2.0 percent tin, 0.5 to 1.0 percent of a solute composed of niobium and tellurium, and the balance zirconium.

In a fourth embodiment of this invention the alloy tube 21 is made from a fourth zirconium alloy, consisting essentially of by weight percent 0.5 to 2.0 percent tin, 0.6 to 1.0 percent of a solute, the solute being composed of niobium, molybdenum and tellurium, the amount of niobium being at least 0.5 percent, and the balance zirconium.

In a fifth embodiment of this invention, the alloy tube 21 is made from a fifth zirconium alloy, consists essentially of by weight percent 0.5 to 2.0 percent tin, 0.3 to 1.4 percent of a solute composed of tellurium, and the remainder zirconium.

In a sixth embodiment of this invention, the alloy tube 21 is made from a sixth zirconium alloy, consisting essentially of by weight percent 0.5 to 1.0 percent bismuth, approximately 0.5 to 1.0 percent of a solute composed of a member selected from the group consisting of molybdenum, niobium, tellurium and mixtures thereof, and the balance being zirconium.

In a seventh embodiment of this invention, the alloy tube 21 is made from a seventh zirconium alloy, consisting essentially of by weight percent 0.5 to 2.5 percent of a mixture of tin and bismuth, approximately 0.5 to 1.0 percent of a solute composed of a member selected from the group consisting of molybdenum, niobium, tellurium and mixtures thereof, and the balance being zirconium.

In an eighth embodiment of this invention, the alloy tube 21 is made from an eighth zirconium alloy, consisting essentially of by weight percent 0.5 to 2.5 percent bismuth, 0.3 to 1.0 percent of a solute composed of tellurium, and the balance zirconium.

In a ninth embodiment of this invention, the alloy tube 21 is made from a ninth zirconium alloy, consisting essentially of by weight percent 0.5 to 2.5 percent of a mixture of tin and bismuth, 0.3 to 1.0 weight percent of a solute composed of tellurium, and the balance zirconium.

Container claddings made from one of the first through the ninth zirconium alloys described above provide an increased resistance to nodular corrosion over prior zirconium alloy tubes.

It should be noted that the first through the ninth zirconium alloys described herein will also optionally contain from about 0.09 to 0.16 weight percent of oxygen. Most commercial grade sponge zirconium which would be used in making alloys such as the ones in the present invention will contain small amounts of oxygen, roughly on the order of about 800–1300 parts per million. In some instances, it will be desirable to increase the concentration of oxygen in the alloy. Adding oxygen is one way to increase room temperature yield strength. Thus, the alloys of the present invention may be produced with or without the additional oxygen, as this will have little or no effect on the corrosion resistance of the alloys.

Figure 3:
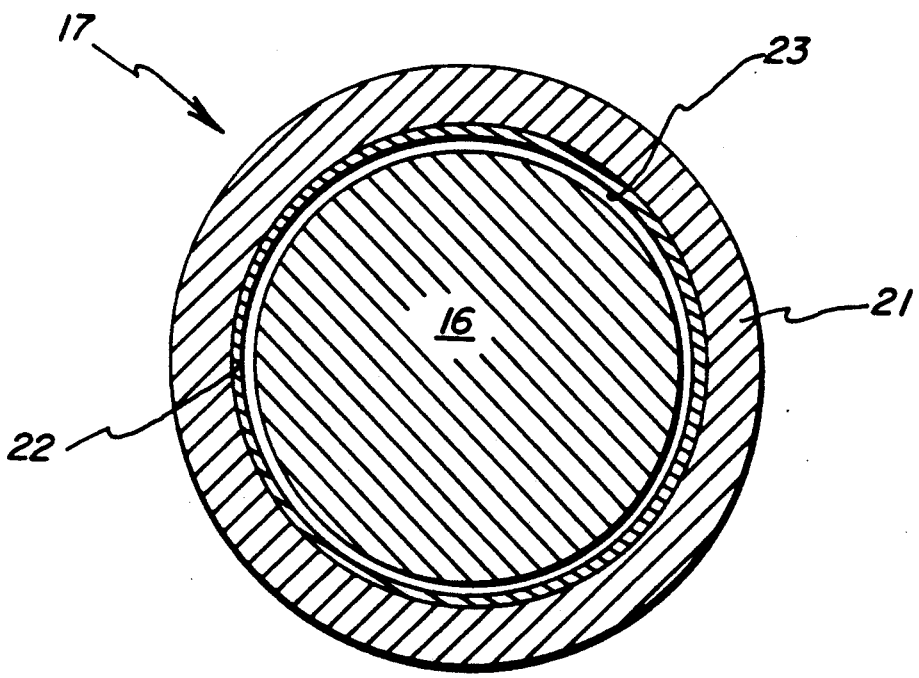
FIG. 3 is a cross-section of a nuclear fuel rod cladding having an inner barrier layer containing nuclear fuel.

Another embodiment of this invention is shown by referring to FIG. 3. The nuclear fuel material 16 forming the central core of the fuel element 14 is surrounded by a composite cladding 17. The composite cladding container encloses the core so as to leave a gap 23 between the core and the cladding container during use in a nuclear reactor. The composite cladding is comprised of a zirconium alloy tube 21 made from one of the first through the ninth zirconium alloys described above. The alloy tube has bonded on the inside surface thereof a metal barrier 22 so that the metal barrier forms a shield between the alloy tube 21 and the nuclear fuel material held in the cladding. The metal barrier forms about 1 to about 30 percent of the thickness of the cladding, and is comprised of a low neutron absorption material, namely, moderate purity zirconium. One moderate purity zirconium is sponge zirconium. The metal barrier 22 protects the alloy tube portion of the cladding from contact and reaction with gasses and fission products from the nuclear fuel, and prevents the occurrence of localized stress and strain.

The content of the metal barrier of moderate purity zirconium is important and serves to impart special properties to the metal barrier. Generally, there is at least about 1,000 parts per million (ppm) by weight and less than about 5,000 ppm impurities in the material of the metal barrier and preferably less than about 4,200 ppm. Of these, oxygen is kept within the range of about 200 to about 1,200 ppm. All other impurities are within the normal range for commercial, reactor-grade sponge zirconium.

Figure 4:
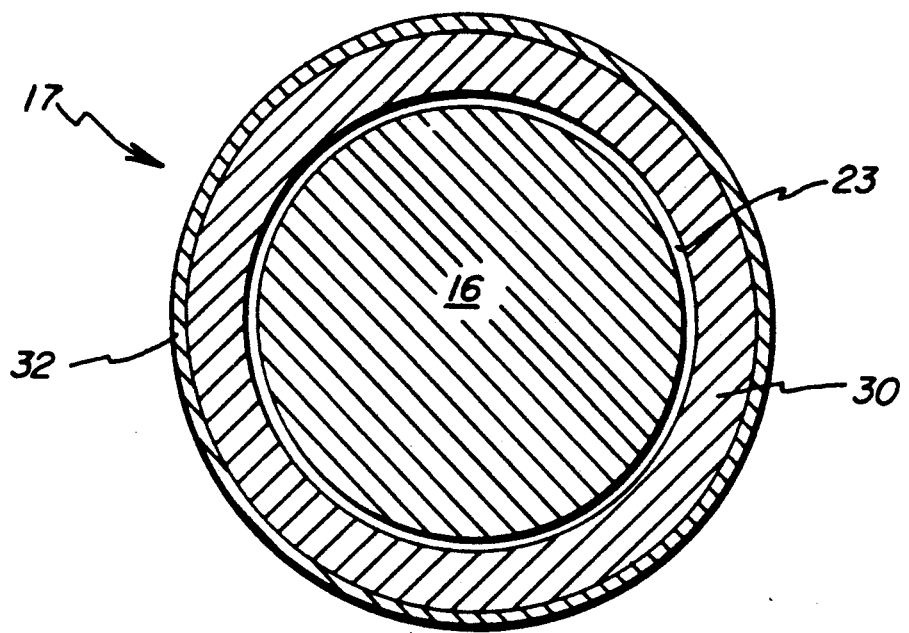
FIG. 4 is a cross-section of a nuclear fuel rod cladding having an outer surface layer containing nuclear fuel.

In another embodiment of this invention, a corrosion-resistant nuclear fuel element is shown by referring to FIG. 4. The nuclear fuel material 16 forming the central core of fuel element 14 is surrounded by a composite cladding 17. The composite cladding container encloses the core so as to leave a gap 23 between the core and the cladding container during use in a nuclear reactor. The composite cladding is comprised of a zirconium alloy tube 30 made from a Zircaloy alloy. The alloy tube has bonded on the outside surface thereof a metal layer 32 so that the metal layer forms a corrosion protective shield over the alloy tube. The outer metal layer is about 5 to 20 percent of the thickness of the alloy tube and is comprised of one of the first through the ninth zirconium alloys described above. The outer metal layer protects the Zircaloy alloy tube portion of the cladding from nodular corrosion.

Figure 5:
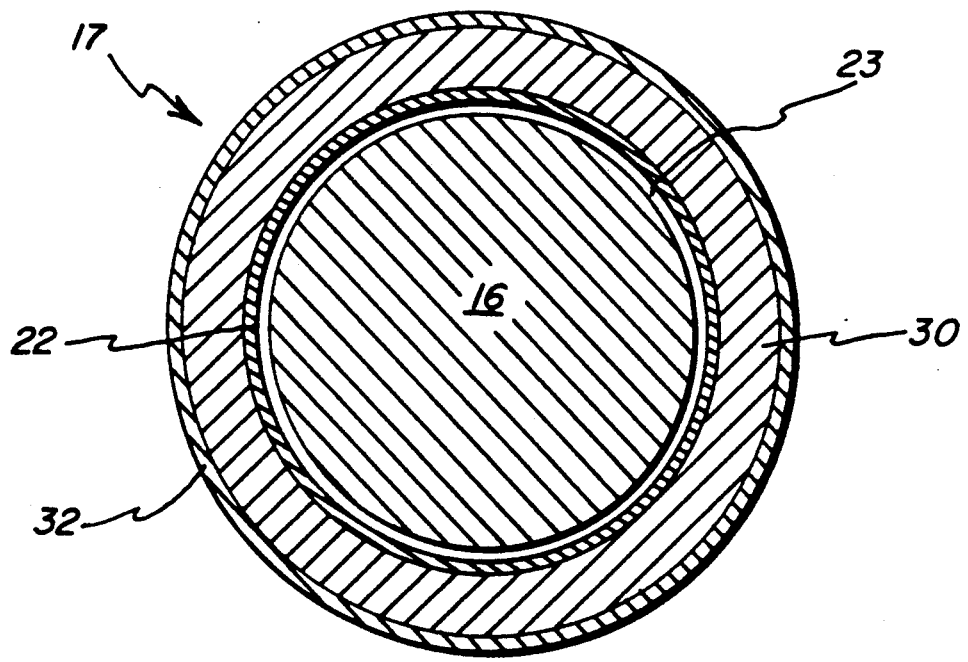
FIG. 5 is a cross-section of a nuclear fuel rod cladding having an inner barrier layer and an outer surface, and containing nuclear fuel.

Another improved nuclear fuel element is shown by referring to FIG. 5. The nuclear fuel material 16 forming the central core of fuel element 14 is surrounded by a composite cladding 17. The composite cladding container encloses the core so as to leave a gap 23 between the core and the cladding container during use in a nuclear reactor. The composite cladding is comprised of a Zircaloy alloy tube 30. The alloy tube has bonded on the inside surface thereof a metal barrier 22 so that the metal barrier forms a shield between the alloy tube 30 and the nuclear fuel material held in the cladding. The metal barrier is about 1 to about 30 percent of the thickness of the alloy tube and is comprised of a low neutron absorption material, namely, moderate purity zirconium as described above. The metal barrier 22 protects the alloy tube portion of the cladding from contact and reaction with gases and fission products from the nuclear fuel, and prevents the occurrence of localized stress and strain. The outer surface layer is bonded on the outside surface of the alloy tube 30. The outer metal layer is about 5 to 20 percent of the thickness of the alloy tube and is comprised of one of the first through the ninth zirconium alloys described above. The outer metal layer protects the Zircaloy alloy tube portion of the cladding from modular corrosion.

Sponge zirconium metal forming the metal barrier in the composite cladding is highly resistant to radiation hardening, and this enables the metal barrier after prolonged irradiation to maintain desirable structural properties such as yield strength and hardness at levels considerably lower than those of conventional zirconium alloys. In effect, the metal barrier does not harden as much as conventional zirconium alloys when subjected to irradiation, and this together with its initially low yield strength enables the metal barrier to deform plastically and relieve pellet-induced stresses in the fuel element during power transients. Pellet induced stresses in the fuel element can be brought about, for example, by swelling of the pellets of nuclear fuel at reactor operating temperatures (300° C. to 350° C.) so that the pellet comes into contact with the cladding.

It has further been discovered that a metal barrier of sponge zirconium of the order preferably about 5 to 15 percent of the thickness of the cladding and a particularly preferred thickness of 10 percent of the cladding bonded to the alloy tube of a zirconium alloy provides stress reduction and a barrier effect sufficient to prevent failures in the composite cladding.

The corrosion resistant nuclear fuel rod cladding used in the nuclear fuel elements of this invention can be fabricated from a billet comprised of a zirconium alloy made from one of the first through the ninth zirconium alloys described above. The billet is heated to 590° to 650° C. and extruded. The extruded tubing is then subjected to a process involving conventional tube reduction until the desired size of tubing is achieved.

In another method, a hollow collar of the sponge zirconium selected to be the metal barrier is inserted into a hollow billet of one of the first through the ninth zirconium alloys described above. The assembly is heated to 590° to 650° C. and extruded. The extruded tubing is then subjected to a process involving conventional tube reduction until the desired size of cladding is achieved.

In another method, a tube blank is made from a Zircaloy alloy and an outer tube is placed on this tube blank. The outer tube is composed of the first through the ninth zirconium alloys described above. This assembly is then heated to a temperature in the range of 590° to 650° C. and is extruded. The extruded tubing is then subjected to a process involving conventional tube reduction until the desired size of tubing is achieved.

In another method, a tube blank is made from a Zircaloy alloy and an outer tube is placed on this tube blank. The outer tube is composed of the first through the ninth zirconium alloys described above. A hollow collar of the sponge zirconium selected to be the metal barrier is inserted into the tube blank. The assembly is heated to a temperature in the range of 590° to 650° C. and is extruded. The extruded tubing is then subjected to a process involving conventional tube reduction until the desired size of tubing is achieved.

Intermediate and final anneals are used during the tube reduction processes described above. Anneals range between 570° to 590° C.

The invention includes a method of producing a nuclear fuel element comprising making a cladding or a composite cladding container comprised of a zirconium alloy, or a zirconium alloy and a barrier layer, or a Zircaloy alloy and a surface layer, or a Zircaloy alloy and an outer surface layer and an inner barrier layer. The container is open at one end and filled with a core of nuclear fuel material leaving a gap between the core and the container and leaving a cavity at the open end. A nuclear fuel material retaining means is inserted into the cavity and an enclosure is applied to the open end of the container, leaving the cavity in communication with the nuclear fuel. The end of the clad container is then bonded to the enclosure to form a tight seal therebetween.

The present invention offers several advantages promoting a long operating life for a nuclear fuel element. A greater resistance to nodular corrosion protects the strength and integrity of the cladding. On cladding having a barrier layer, the reduction of chemical interaction on the cladding, the minimization of localized stress on the zirconium alloy tube portion of the cladding, and the minimization of stress corrosion and strain corrosion on the zirconium alloy tube portion of the cladding, all reduce the probability of a splitting failure occurring in the zirconium alloy tube. The invention further reduces expansion or swelling of the nuclear fuel into direct contact with the zirconium alloy tube, and this reduces the occurrence of localized stress on the zirconium alloy tube, initiation or acceleration of stress corrosion of the alloy tube and bonding of the nuclear fuel to the alloy tube.

An important property of the composite cladding of this invention is that the foregoing improvements are achieved with no substantial additional neutron absorption penalty. Further, the composite cladding has a very small heat transfer penalty in that there is no thermal barrier to transfer of heat, such as results in a situation where a separate foil or a liner is inserted in a fuel element. Also, the composite cladding of this invention is inspectable by conventional non-destructive testing methods during various stages of fabrication and operation.

The following examples are offered to further illustrate the improved nodular corrosion resistance of the alloys used in this invention.

EXAMPLES

Tests for both uniform corrosion resistance and nodular corrosion resistance have been conducted on alloys representative of the first through the ninth zirconium alloys used in the present invention. These tests have shown that a dramatic decrease in susceptibility to nodular corrosion can be attained in an alloy which is relatively insensitive to heat treatment while retaining essentially the same uniform corrosion resistance of a Zircaloy 2 alloy.

Table 1 lists several examples of alloys of the present invention, along with three entries at the bottom of the table which are Zircaloy 2 alloys in three different heat treatment states. These alloys were tested in water containing 8 ppm oxygen at 288° C. and 1500 psig, conditions similar to a reactor operating temperature and pressure but absent a radiation source, to evaluate the resistance to uniform corrosion.

It can be seen from the results in this table that the tested alloys of the present invention exhibit excellent resistance to uniform corrosion. The uniform corrosion rates in most cases being comparable to those of the Zircaloy 2 specimens. None of the specimens tested under these conditions exhibit any sign of the formation of nodular corrosion products.

Table 2 reports the results of tests conducted to determine the susceptibility of the Zirconium alloys of the present invention to nodular corrosion. The test conditions used were those which induce in the laboratory the formation of the nodular corrosion products on Zircaloy alloys that have been annealed at 750° C. for forty-eight hours and are identical to that nodular corrosion sometimes found on Zircaloy after being used in reactor service. For purposes of comparison, the weight gains of the annealed Zircaloy under the same test conditions were on the order of several thousand milligrams per square decimeter.

The Zirconium alloys of the present invention were tested in various heat treatment states. The results in Table 2 also provide an indication that the corrosion-resistance properties of these alloys are relatively insensitive to the heat treatment state of the specimen. Some compositions were tested using specimens in cold rolled plate form, both with and without a subsequent anneal. Others were tested in the as-cast form, both with and without subsequent annealing. Several compositions were tested only after having been annealed. The 750° C. anneal for forty-eight hours, which all of the tested alloys of the present invention were subjected to, is the heat treatment which strips the Zircaloy 2 alloy of its resistance to nodular corrosion under the laboratory steam tests.

All of the weight gains reported in Table 2 are far superior to the results obtained when sensitized or annealed Zircaloy alloy is tested. Most of the alloys of the present invention produced weight gains of less than 100 mg/dm$^2$, while the remainder produced weight gains on the order of one or two hundred milligrams per square decimeter. As previously mentioned, weight gains reported in tests of sensitized Zircaloy specimens under the same test times and conditions are on the order of several thousand milligrams per square decimeter.

In addition to the reduced weight gains evidenced in the alloys of the present invention, none of these alloys showed any sign of formation of nodular corrosion products. Under the test conditions, these alloys clearly provide improvement in resistance to nodular corrosion.

TABLE 1

OXIDE GROWTH/WEIGHT GAIN IN WATER AT 288° C., 1500 psig. 8 ppm OXYGEN

| Zr Alloy Composition Weight Percent | | | | | Weight Gain (mg/dm$^2$) | |
|---|---|---|---|---|---|---|
| Sn | Nb | Mo | Te | Bi | 1000 hrs. | 1700 hrs. |
| 1.51 | 0.38 | .0.19 | | | 13.8 | 14.0 |
| 1.56 | 0.21 | | 0.38 | | 9.5 | 10.3 |
| 1.53 | 0.39 | | 0.22 | | 11.3 | 12.0 |
| 1.57 | 0.26 | 0.15 | 0.16 | | 13.3 | 10.8 |
| 1.55 | 0.2 | 0.18 | 0.2 | | 11.7 | 12.5 |
| 1.60 | | | 0.58 | | 9.7 | 11.5 |
| 1.16 | | | 0.72 | | 9.8 | 11.0 |
| 1.13 | | | 0.60 | | 10.5 | 12.5 |
| 1.65 | | | 0.68 | | 10.0 | 12.0 |
| 1.54 | | | 0.69 | | 12.5 | 20.8 |
| 1.50 | 0.29 | 0.28 | | | 15.3 | 19.0 |
| 1.50 | | 0.5 | | | 13.5 | 16.8 |
| 1.49 | 0.34 | 0.32 | | | 11.0 | 13.6 |
| 1.5 | 0.2 | 0.4 | | | 21.8 | 50.0 |
| 1.0 | 0.2 | 0.4 | | | 21.2 | 40.0 |
| 1.5 | 0.4 | 0.3 | | | 16.8 | 33.0 |
| | | | 1.4 | | 18.0 | 33.8 |
| 1.3 | | | 0.6 | | 4.3 | b |
| | 0.5 | | | 1.4 | 12.0 | 14.5 |
| | 0.5 | | | 2.0 | 12.0 | b |
| | 0.3 | 0.3 | | 0.8 | 20.5 | 32.0 |
| | 0.5 | 0.5 | | 0.7 | 39.8 | 65.0 |
| | | | 0.28 | 0.66 | 11.8 | 15.0 |
| | | | 0.33 | 0.84 | 9.3 | 11.0 |
| | | | 0.41 | 1.12 | 15.8 | 22.0 |
| | 0.3 | 0.3 | | 1.6 | 85.0 | 150.0 |
| 1.0 | 0.5 | | | 1.0 | 9.3 | 11.2 |
| Z2 | (Zircaloy 2, cross-rolled commercial plate) | | | | 11.0 | 13.2 |
| Z2 | w/750° C./16 hr. anneal | | | | 11.0 | 15.0 |
| Z2 | w/Beta quench | | | | 15.0 | 17.0 | b — Test not completed.

TABLE 2

WEIGHT GAIN AFTER EXPOSURE TO STEAM AT 510° C., 1500 psig FOR 24 HOURS

| Zr Alloy Composition Weight/Percent | | | | | Weight Gain (mg/dm$^2$) | | Cold Rolled 0.1" | | |
|---|---|---|---|---|---|---|---|---|---|
| Bi | Sn | Nb | Mo | Te | As Cast | 750° C./48 hr. | As Rolled | 750° C./48 hr. | 920° C./3 hr. |
| 1.4 | 0.5 | | | | 44 | 43 | * | 51 | 66 |
| 0.8 | 0.3 | 0.3 | | | 53 | 57 | * | 49 | 60 |
| 2.5 | 0.5 | | | | 68 | 70 | * | 76 | 116 |
| 0.7 | 0.5 | 0.5 | | | 53 | 81 | * | 56 | 116 |
| 1.6 | 0.3 | 0.3 | | | 76 | 82 | * | 73 | 132 |
| 1.5 | | 0.5 | | | 96 | 103 | * | 82 | 182 |
| 1.7 | 0.5 | 0.5 | | | 119 | 141 | * | 111 | 264 |
| 2.5 | | 0.5 | | | 247 | 196 | * | 135 | 434 |

TABLE 2-continued
WEIGHT GAIN AFTER EXPOSURE TO STEAM AT 510° C., 1500 psig FOR 24 HOURS

| Zr Alloy Composition Weight/Percent | | | | | Weight Gain (mg/dm$^2$) | | Cold Rolled 0.1" | | |
| --- | --- | --- | --- | --- | --- | --- | --- | --- | --- |
| Bi | Sn | Nb | Mo | Te | As Cast | 750° C./48 hr. | As Rolled | 750° C./48 hr. | 920° C./3 hr. |
| 0.66 | | | | 0.28 | 157 | 82 | * | 95 | * |
| 0.84 | | | | 0.33 | 114 | 82 | * | 93 | * |
| 1.12 | | | | 0.41 | 109 | 130 | * | 100 | * |
| 0.5 | | | | 0.5 | 396 | 177 | * | * | * |
| 1.5 | | | | 0.5 | 120 | 142 | * | * | * |
| 1.0 | 1.0 | 0.5 | | | * | * | 43 | 51 | * |
| 1.5 | 0.7 | 0.5 | | | * | * | 44 | 54 | * |
| 1.0 | 1.0 | 0.3 | 0.3 | | * | * | 67 | 61 | * |
| 1.5 | 0.7 | 0.3 | 0.3 | | * | * | 80 | 67 | * |
| 1.0 | 1.0 | 0.3 | | 0.3 | * | * | 80 | 55 | * |
| 1.5 | 0.7 | 0.3 | | 0.3 | * | * | 87 | 65 | * |
| 1.0 | 1.0 | 0.2 | 0.2 | 0.2 | * | * | 92 | 63 | * |
| 1.5 | 0.7 | 0.2 | 0.2 | 0.2 | * | * | 102 | 70 | * |
| 1.0 | 1.0 | | | 0.6 | * | * | 163 | 104 | * |
| 1.5 | 0.7 | | | 0.6 | * | * | 172 | 119 | * |
| 1.0 | 1.0 | | 0.5 | | * | * | 109 | 80 | * |
| 1.5 | 0.7 | | 0.5 | | * | * | 130 | 84 | * |
| | 1.51 | 0.38 | 0.19 | | * | * | 44 | 61 | * |
| | 1.56 | 0.21 | | 0.38 | * | * | 69 | 58 | * |
| | 1.53 | 0.39 | | 0.22 | * | * | 47 | 49 | * |
| | 1.57 | 0.26 | 0.15 | 0.16 | * | * | 48 | 58 | * |
| | 1.55 | 0.2 | 0.18 | 0.2 | * | * | 60 | 64 | * |
| | 1.60 | | | 0.58 | * | * | 111 | 107 | * |
| | 1.16 | | | 0.72 | * | * | 94 | 88 | * |
| | 1.13 | | | 0.60 | * | * | 88 | 90 | * |
| | 1.65 | | | 0.68 | * | * | 99 | 95 | * |
| | 1.54 | | | 0.69 | * | * | * | 83 | * |
| | 1.50 | 0.29 | 0.28 | | * | * | * | 70 | * |
| | 1.50 | | 0.5 | | * | * | * | 68 | * |
| | 1.49 | 0.34 | 0.32 | | * | * | 42/43 | 61/57 | * |
| | 1.5 | 0.5 | 0.5 | | * | * | 52 | 70 | * |
| | 1.0 | 0.5 | 0.5 | | * | * | 85 | 70 | * |
| | 1.5 | 0.5 | 0.5 | | * | * | 70 | 68 | * |
| | 1.5 | 0.15 | 0.15 | 0.3 | * | * | 65 | 67 | * |
| | 1.5 | 0.15 | 0.3 | 0.15 | * | * | 65 | 63 | * |
| | 1.0 | | | 0.30 | 214 | 117 | * | * | * |
| | 1.5 | | | 0.30 | 260 | 107 | * | * | * |
| | 0.5 | | | 0.50 | 144 | 88 | * | * | * |
| | 1.3 | | | 0.60 | * | * | 45 | 42 | * |
| | 1.5 | | | 1.00 | 100 | 156 | * | * | * |
| | | | | 1.4 | * | 74 | * | * | * |
| | 2.0 | 0.30 | 0.30 | | * | 102 | * | * | * |
| | 0.5 | 0.50 | 0.50 | | * | 62 | * | * | * |
| | 1.0 | 0.50 | 0.50 | | * | 79 | * | * | * |
| | 1.5 | 0.50 | 0.50 | | * | 108 | * | * | * |

*Not tested.

What is claimed is:

1. A corrosion resistant nuclear fuel element, comprising:
an elongated composite cladding container having a zirconium alloy tube consisting essentially of, by weight percent; 0.5 to 2.0 percent tin, 0.2 to 1.5 percent of a solute composed of molybdenum and tellurium and the balance zirconium, the container having a barrier layer of sponge zirconium metallurgically bonded to the inside surface of the alloy tube, the sponge zirconium being about 1 to 30 percent of the thickness of the alloy tube; and
a central core of a body of nuclear fuel material selected from the group consisting of compounds of uranium, plutonium, thorium and mixtures thereof disposed in and partially filling the container so as to leave a gap between the container and the core and an internal cavity at one end of the container, an enclosure integrally secured and sealed at each end of the container and a nuclear fuel material retaining means positioned in the cavity.

2. The nuclear fuel element of claim 1 wherein the zirconium alloy tube further consists essentially of 0.09 to 0.16 weight percent oxygen.

3. A corrosion resistant nuclear fuel element, comprising:
an elongated composite cladding container having a zirconium alloy tube consisting essentially of, by weight percent; 0.5 to 2.0 percent tin, 0.2 to 1.5 percent of a solute composed of less than 0.5 percent niobium, and a member selected from the group consisting of molybdenum tellurium, and mixtures thereof, and the balance zirconium, the container having a barrier layer of sponge zirconium metallurgically bonded to the inside surface of the alloy tube, the sponge zirconium being about 1 to 30 percent of the thickness of the alloy tube; and
a central core of a body of nuclear fuel material selected from the group consisting of compounds of uranium, plutonium, thorium and mixtures thereof disposed in and partially filling the container so as to leave a gap between the container and the core and an internal cavity at one end of the container, an enclosure integrally secured and sealed at each end of the container and a nuclear fuel material retaining means positioned in the cavity.

4. The corrosion resistant nuclear fuel element of claim 3 wherein the solute is composed of niobium and tellurium.

5. The nuclear fuel element of claim 3 wherein the zirconium alloy tube further consists essentially of 0.09 to 0.16 weight percent oxygen.

6. The nuclear fuel element of claim 4 wherein the zirconium alloy tube further consists essentially of 0.09 to 0.16 weight percent oxygen.

7. A corrosion resistant nuclear fuel element, comprising:
an elongated composite cladding container having a zirconium alloy tube consisting essentially of, by weight percent; 0.5 to 2.0 percent tin, 0.6 to 1.5 percent of a solute composed of molybdenum, tellurium, and at least 0.5 percent niobium, and the balance zirconium, the container having a barrier layer of sponge zirconium metallurgically bonded to the inside surface of the alloy tube, the sponge zirconium being about 1 to 30 percent of the thickness of the alloy tube; and
a central core of a body of nuclear fuel material selected from the group consisting of compounds of uranium, plutonium, thorium and mixtures thereof disposed in and partially filling the container so as to leave a gap between the container and the core and an internal cavity at one end of the container, an enclosure integrally secured and sealed at each end of the container and a nuclear fuel material retaining means positioned in the cavity.

8. The nuclear fuel element of claim 7 wherein the zirconium alloy tube further consists essentially of 0.09 to 0.16 weight percent oxygen.

9. A corrosion resistant nuclear fuel element, comprising:
an elongated composite cladding container having a zirconium alloy tube consisting essentially of, by weight percent; 0.5 to 2.5 percent bismuth, 0.2 to 1.5 percent of a solute composed of a member selected from the group consisting of molybdenum, niobium, tellurium and mixtures thereof, and the balance zirconium, the container having a barrier layer of sponge zirconium metallurgically bonded to the inside surface of the alloy tube, the sponge zirconium being about 1 to 30 percent of the thickness of the alloy tube; and
a central core of a body of nuclear fuel material selected from the group consisting of compounds of uranium, plutonium, thorium and mixtures thereof disposed in and partially filling the container so as to leave a gap between the container and the core and at internal cavity at one end of the container, an enclosure integrally secured and sealed at each end of the container and a nuclear fuel material retaining means positioned in the cavity.

10. The corrosion resistant nuclear fuel element of claim 9 wherein the solute is niobium.

11. The corrosion resistant nuclear fuel element of claim 9 wherein the zirconium alloy tube consists essentially of 0.5 to 2.5 percent bismuth and tin, 0.2 to 1.5 percent of a solute composed of a member selected from the group consisting of molybdenum, niobium, tellurium and mixtures thereof, and the balance zirconium.

12. The corrosion resistant nuclear fuel element of claim 11 wherein the solute is niobium.

13. The corrosion resistant nuclear fuel element of claim 9 wherein the solute is 0.5 to 1.0 weight percent.

14. The corrosion resistant nuclear fuel element of claim 10 wherein the solute is 0.5 to 1.0 weight percent.

15. The corrosion resistant nuclear fuel element of claim 11 wherein the solute is 0.5 to 1.0 weight percent.

16. The corrosion resistant nuclear fuel element of claim 12 wherein the solute is 0.5 to 1.0 weight percent.

17. The nuclear fuel element of claim 9 wherein the zirconium alloy tube further consists essentially of 0.09 to 0.16 weight percent oxygen.

18. The nuclear fuel element of claim 10 wherein the zirconium alloy tube further consists essentially of 0.09 to 0.16 weight percent oxygen.

19. The nuclear fuel element of claim 11 wherein the zirconium alloy tube further consists essentially of 0.09 to 0.16 weight percent oxygen.

20. The nuclear fuel element of claim 12 wherein the zirconium alloy tube further consists essentially of 0.09 to 0.16 weight percent oxygen.

21. The nuclear fuel element of claim 13 wherein the zirconium alloy tube further consists essentially of 0.09 to 0.16 weight percent oxygen.

22. The nuclear fuel element of claim 16 wherein the zirconium alloy tube further consists essentially of 0.09 to 0.16 weight percent oxygen.

23. The nuclear fuel element of claim 15 wherein the zirconium alloy tube further consists essentially of 0.09 to 0.16 weight percent oxygen.

24. The nuclear fuel element of claim 16 wherein the zirconium alloy tube further consists essentially of 0.09 to 0.16 weight percent oxygen.

25. A corrosion resistant nuclear fuel element, comprising:
an elongated composite cladding container having a Zircaloy alloy tube;
a surface layer on the outside of the alloy tube formed of a zirconium alloy with a layer thickness of about 5 to 20 percent of the total wall thickness of the alloy tube, the zirconium alloy consisting essentially of, by weight percent; 0.5 to 2.0 percent tin, 0.2 to 1.5 percent of a solute composed of molybdenum and tellurium and the balance zirconium; and
a central core of a body of nuclear fuel material selected from the group consisting of compounds of uranium, plutonium, thorium and mixtures thereof disposed in and partially filling the container so as to leave a gap between the container and the core and an internal cavity at one end of the container an enclosure integrally secured and sealed at each end of the container and a nuclear fuel material retaining means positioned in the cavity.

26. The nuclear fuel element of claim 25 wherein the zirconium alloy tube further consists essentially of 0.09 to 0.16 weight percent oxygen.

27. A corrosion resistant nuclear fuel element, comprising:
an elongated composite cladding container having a Zircaloy alloy tube;
a surface layer on the outside of the alloy tube formed of a zirconium alloy with a layer thickness of about 5 to 20 percent of the total wall thickness of the alloy tube, the zirconium alloy consisting essentially of, by weight percent; 0.5 to 2.0 percent tin, 0.2 to 1.5 percent of a solute composed to less than 0.5 percent niobium, and a member selected from the group consisting of molybdenum, tellurium, and mixtures thereof, and the balance zirconium; and a central core of a body of nuclear fuel material selected from the group consisting of compounds of uranium, plutonium, thorium and mixtures thereof disposed in and partially filling the container so as to leave a gap between the container and the core and an internal cavity at one end of the container an enclosure integrally secured and sealed at each end of the container and a nuclear fuel material retaining means positioned in the cavity.

28. The corrosion resistant nuclear fuel element of claim 27 wherein the solute is composed of niobium and tellurium.

29. The nuclear fuel element of claim 27 wherein the zirconium alloy tube further consists essentially of 0.09 to 0.16 weight percent oxygen.

30. The nuclear fuel element of claim 28 wherein the zirconium alloy tube further consists essentially of 0.09 to 0.16 weight percent oxygen.

31. A corrosion resistant nuclear fuel element, comprising:

an elongated composite cladding container having a Zircaloy alloy tube;

a surface layer on the outside of the alloy tube formed of a zirconium alloy with a layer thickness of about 5 to 20 percent of the total wall thickness of the alloy tube, the zirconium alloy consisting essentially of, by weight percent; 0.5 to 2.0 percent tin, 0.6 to 1.5 percent of a solute composed molybdenum, tellurium, and at least 0.5 percent niobium, and the balance zirconium; and a central core of a body of nuclear fuel material selected from the group consisting of compounds of uranium, plutonium, thorium and mixtures thereof disposed in and partially filling the container so as to leave a gap between the container and the core and an internal cavity at one end of the container an enclosure integrally secured and sealed at each end of the container and a nuclear fuel material retaining means positioned in the cavity.

32. The nuclear fuel element of claim 31 wherein the zirconium alloy tube further consists essentially of 0.09 to 0.16 weight percent oxygen.

33. A corrosion resistant nuclear fuel element, comprising:

an elongated composite cladding container having a Zircaloy alloy tube;

a surface layer on the outside of the alloy tube formed of a zirconium alloy with a layer thickness of about 5 to 20 percent of the total wall thickness of the alloy tube, the zirconium alloy consisting essentially of, by weight percent; 0.5 to 2.5 percent bismuth, 0.2 to 1.5 percent of a solute composed of a member selected from the group consisting of molybdenum, niobium, tellurium and mixtures thereof, and the balance zirconium, the container having a barrier layer of sponge zirconium metallurgically bonded to the inside surface of the alloy tube, the sponge zirconium being about 1 to 30 percent of the thickness of the alloy tube; and a central core of a body of nuclear fuel material selected from the group consisting of compounds of uranium, plutonium, thorium and mixtures thereof disposed in and partially filling the container so as to leave a gap between the container and the core and an internal cavity at one end of the container, an enclosure integrally secured and sealed at each end of the container and a nuclear fuel material retaining means positioned in the cavity.

34. The corrosion resistant nuclear fuel element of claim 33 wherein the solute is niobium.

35. The corrosion resistant nuclear fuel element of claim 33 wherein the zirconium alloy tube consists essentially of 0.5 to 2.5 weight percent bismuth and tin, 0.2 to 1.5 percent of a solute composed of a member selected from the group consisting of molybdenum, niobium, tellurium and mixtures thereof, and the balance zirconium.

36. The corrosion resistant nuclear fuel element of claim 35 wherein the solute is niobium.

37. The corrosion resistant nuclear fuel element of claim 33 wherein the solute is 0.5 to 1.0 weight percent.

38. The corrosion resistant nuclear fuel element of claim 36 wherein the solute is 0.5 to 1.0 weight percent.

39. The corrosion resistant nuclear fuel element of claim 35 wherein the solute is 0.5 to 1.0 weight percent.

40. The corrosion resistant nuclear fuel element of claim 38 wherein the solute is 0.5 to 1.0 weight percent.

41. The nuclear fuel element of claim 35 wherein the zirconium alloy tube further consists essentially of 0.09 to 0.16 weight percent oxygen.

42. The nuclear fuel element of claim 36 wherein the zirconium alloy tube further consists essentially of 0.09 to 0.16 weight percent oxygen.

43. The nuclear fuel element of claim 35 wherein the zirconium alloy tube further consists essentially of 0.09 to 0.16 weight percent oxygen.

44. The nuclear fuel element of claim 38 wherein the zirconium alloy tube further consists essentially of 0.09 to 0.16 weight percent oxygen.

45. The nuclear fuel element of claim 37 wherein the zirconium alloy tube further consists essentially of 0.09 to 0.16 weight percent oxygen.

46. The nuclear fuel element of claim 40 wherein the zirconium alloy tube further consists essentially of 0.09 to 0.16 weight percent oxygen.

47. The nuclear fuel element of claim 41 wherein the zirconium alloy tube further consists essentially of 0.09 to 0.16 weight percent oxygen.

48. The nuclear fuel element of claim 42 wherein the zirconium alloy tube further consists essentially of 0.09 to 0.16 weight percent oxygen.

49. A corrosion resistant nuclear fuel assembly, comprising:

elongated cladding containers having a central core of a body of nuclear fuel material disposed in and partially filling the cladding containers, the fuel material having a smaller diameter than the containers, a nuclear fuel material retaining means positioned in one end of the containers, and sealing means at both ends of each container;

a tubular flow channel having a cross section suitable for disposing an array of cladding containers within the channel; and means for mounting the cladding containers in the channel to fixedly support the containers in flowing coolant in a nuclear reactor, where the cladding containers, channel, and mounting means are at least formed from a zirconium alloy consisting essentially of, by weight percent; 0.5 to 2.0 percent tin, 0.2 to 1.5 percent of a solute composed of molybdenum and tellurium and the balance zirconium, so that the alloy protects the assembly from corrosion.

50. The nuclear fuel assembly of claim 49 wherein the zirconium alloy further consists essentially of 0.09 to 0.16 weight percent oxygen.

51. A corrosion resistant nuclear fuel assembly, comprising:
elongated cladding containers having a central core of a body of nuclear fuel material disposed in and partially filling the cladding containers, the fuel material having a smaller diameter than the containers, a nuclear fuel material retaining means positioned in one end of the containers, and sealing means at both ends of each container;
a tubular flow channel having a cross section suitable for disposing an array of cladding containers within the channel; and
means for mounting the cladding containers in the channel to fixedly support the containers in flowing coolant in a nuclear reactor, where the cladding containers, channel, and mounting means are at least formed from a zirconium alloy consisting essentially of, by weight percent; 0.5 to 2.0 percent tin, 0.2 to 1.5 percent of a solute composed of less than 0.5 percent niobium, and a member selected from the group consisting of molybdenum, tellurium and mixtures thereof, and the balance zirconium, so that the alloy protects the assembly from corrosion.

52. The nuclear fuel assembly of claim 51 wherein the solute is composed of niobium and tellurium.

53. The nuclear fuel assembly of claim 51 wherein the zirconium alloy further consists essentially of 0.09 to 0.16 weight percent oxygen.

54. The nuclear fuel assembly of claim 52 wherein the zirconium alloy further consists essentially of 0.09 to 0.16 weight percent oxygen.

55. A corrosion resistant nuclear fuel assembly, comprising:
elongated cladding containers having a central core of a body of nuclear fuel material disposed in and partially filling the cladding containers, the fuel material having a smaller diameter than the containers, a nuclear fuel material retaining means positioned in one end of the containers, and sealing means at both ends of each container;
a tubular flow channel having a cross section suitable for disposing an array of cladding containers within the channel; and
means for mounting the cladding containers in the channel to fixedly support the containers in flowing coolant in a nuclear reactor, where the cladding containers, channel, and mounting means are at least formed from a zirconium alloy consisting essentially of, by weight percent; 0.5 to 2.0 percent tin, 0.6 to 1.5 percent of a solute composed of molybdenum, tellurium and at least 0.5 percent niobium, and the balance zirconium, so that the alloy protects the assembly from corrosion.

56. The nuclear fuel assembly of claim 55 wherein the zirconium alloy further consists essentially of 0.09 to 0.16 weight percent oxygen.

57. A corrosion resistant nuclear fuel assembly, comprising:
elongated cladding containers having a central core of a body of nuclear fuel material disposed in and partially filling the cladding containers, the fuel material having a smaller diameter than the containers, a nuclear fuel material retaining means positioned in one end of the containers, and sealing means at both ends of each container;
a tubular flow channel having a cross section suitable for disposing an array of cladding containers within the channel; and
means for mounting the cladding containers in the channel to fixedly support the containers in flowing coolant in a nuclear reactor, where the cladding containers, channel, and mounting means are at least formed from a zirconium alloy consisting essentially of, by weight percent; 0.5 to 2.5 percent bismuth, 0.2 to 1.5 percent of a solute composed of a member selected from the group consisting of molybdenum, niobium, tellurium and mixtures thereof, and the balance zirconium, so that the alloy protects the assembly from corrosion.

58. The nuclear fuel assembly of claim 57 wherein the solute is niobium.

59. The nuclear fuel assembly of claim 57 wherein the zirconium alloy consists essentially of 0.5 to 2.5 percent bismuth and tin, 0.2 to 1.5 percent of a solute composed of a member selected from the group consisting of molybdenum, niobium, tellurium and mixtures thereof, and the balance zirconium.

60. The nuclear fuel assembly of claim 59 wherein the solute is niobium.

61. The nuclear fuel assembly of claim 57 wherein the solute is 0.5 to 1.0 weight percent.

62. The nuclear fuel assembly of claim 58 wherein the solute is 0.5 to 1.0 weight percent.

63. The nuclear fuel assembly of claim 61 wherein the solute is 0.5 to 1.0 weight percent.

64. The nuclear fuel assembly of claim 60 wherein the solute is 0.5 to 1.0 weight percent.

65. The nuclear fuel assembly of claim 57 wherein the zirconium alloy further consists essentially of 0.09 to 0.16 weight percent oxygen.

66. The nuclear fuel assembly of claim 58 wherein the zirconium alloy further consists essentially of 0.09 to 0.16 weight percent oxygen.

67. The nuclear fuel assembly of claim 59 wherein the zirconium alloy further consists essentially of 0.09 to 0.16 weight percent oxygen.

68. The nuclear fuel assembly of claim 60 wherein the zirconium alloy further consists essentially of 0.09 to 0.16 weight percent oxygen.

69. The nuclear fuel assembly of claim 61 wherein the zirconium alloy further consists essentially of 0.09 to 0.16 weight percent oxygen.

70. The nuclear fuel assembly of claim 62 wherein the zirconium alloy further consists essentially of 0.09 to 0.16 weight percent oxygen.

71. The nuclear fuel assembly of claim 63 wherein the zirconium alloy further consists essentially of 0.09 to 0.16 weight percent oxygen.

72. The nuclear fuel assembly of claim 64 wherein the zirconium alloy further consists essentially of 0.09 to 0.16 weight percent oxygen.

* * * * *